United States Patent
Hansroul et al.

(10) Patent No.: US 9,823,366 B2
(45) Date of Patent: Nov. 21, 2017

(54) RADIATION DETECTOR CALIBRATION USING VOLTAGE INJECTION

(75) Inventors: Marc Hansroul, Québec (CA); Philippe Gauthier, Quebec (CA); Luc Laperriere, Quebec (CA)

(73) Assignee: ANALOGIC CANADA CORP, Quebec (CA)

( * ) Notice: Subject to any disclaimer, the term of this patent is extended or adjusted under 35 U.S.C. 154(b) by 275 days.

(21) Appl. No.: 13/810,861

(22) PCT Filed: Jul. 23, 2010

(86) PCT No.: PCT/IB2010/001823
§ 371 (c)(1),
(2), (4) Date: Jan. 17, 2013

(87) PCT Pub. No.: WO2012/010919
PCT Pub. Date: Jan. 26, 2012

(65) Prior Publication Data
US 2013/0121478 A1    May 16, 2013

(51) Int. Cl.
*G01T 1/24* (2006.01)
*G01T 7/00* (2006.01)
*H04N 5/32* (2006.01)

(52) U.S. Cl.
CPC .............. *G01T 7/005* (2013.01); *G01T 1/247* (2013.01); *H04N 5/32* (2013.01)

(58) Field of Classification Search
CPC ............ G01T 7/005; G01T 1/247; H04N 5/32
See application file for complete search history.

(56) References Cited

U.S. PATENT DOCUMENTS 4,559,639 A * 12/1985 Glover .................. A61B 6/032
250/367
5,262,649 A * 11/1993 Antonuk ................ A61B 6/032
250/370.09

(Continued)

FOREIGN PATENT DOCUMENTS

JP         2006/267101 A        10/2006

OTHER PUBLICATIONS

Korean Office Action cited in Japanese Application No. 2013/521226 dated Apr. 22, 2014, 3 pgs.

(Continued)

*Primary Examiner* — David Porta
*Assistant Examiner* — Shun Lee
(74) *Attorney, Agent, or Firm* — Cooper Legal Group, LLC

(57) ABSTRACT

Among other things, one or more systems and/or techniques for calibrating a direct conversion detector array are provided. An electrical charge is generated on an interface of a photoconductor (e.g., amorphous selenium) of the detector array when there is a change in voltage that is applied to the photoconductor. Such a change in voltage may occur because the voltage that is supplied to the photoconductor by a power supply is changed. The changed voltage causes an electrical charge to be produced, or causes a change in the net charge density at an interface of the photoconductor, that is substantially similar to the electrical charge that may be produced when radiation impinges the detector array. In this way, calibrations of the detector array (e.g., the generation of a uniformity map, defect table, etc.) may be performed without the emission of radiation and onsite or outside of a factory setting.

20 Claims, 4 Drawing Sheets

(56) References Cited

U.S. PATENT DOCUMENTS

| | | | | |
|---|---|---|---|---|
| 5,920,070 A | * | 7/1999 | Petrick | G01T 1/24 250/370.09 |
| 2004/0240612 A1 | * | 12/2004 | Suzuki | 378/91 |
| 2006/0208195 A1 | | 9/2006 | Petrick et al. | |
| 2009/0129538 A1 | * | 5/2009 | Tkaczyk | A61B 6/032 378/5 |
| 2010/0183124 A1 | | 7/2010 | Liu et al. | |

OTHER PUBLICATIONS

International Search Report cited in related application No. PCT/IB2010/001823 dated May 27, 2011.

German Office Action cited in German Application No. 11 2010 005 764.8 dated Jun. 14, 2017, 11 pgs.

* cited by examiner

RADIATION DETECTOR CALIBRATION USING VOLTAGE INJECTION

BACKGROUND

The present application relates to the field of radiography examinations and imaging. It finds particular application with the calibration of direct conversion detector arrays and/or flat panel detectors, such as those commonly comprised within a computed tomography (CT) scanner, a line scanner, or other radiography imaging system (e.g., mammography system, general radiology system, etc).

Radiography imaging systems are useful to provide information, or images, of interior aspects of an object under examination. Generally, the object is exposed to radiation, and a two-dimensional image and/or a three-dimensional image is formed based upon the radiation absorbed by the interior aspects of the object, or rather an amount of radiation that is able to pass through the object. Typically, highly dense aspects of the object absorb more radiation than less dense aspects, and thus an aspect having a higher density, such as a bone, tumor or gun, for example, will be apparent when surrounded by less dense aspects, such as fatty tissue, muscle or clothing, for example.

A radiography imaging system typically comprises a detector array and a radiation source. The radiation source is generally configured to emit a fan, cone, wedge, or other shaped beam of radiation onto an object under examination. The detector array is generally positioned on a diametrically opposing side of the object relative to the radiation source and comprises a plurality of pixels that detect radiation that impinges upon the respective pixels. Typically, the pixels are configured to substantially continuously output an analog or digital signal, and when a charge density (e.g., proportional to the detected radiation) is measured by a pixel, the pixel is configured to emit a pulse, or change, in the respective signal indicative of the charge density. The signals emitted by the respective pixels can be converted into the digital domain (if not already in the digital domain) and used to generate an image(s) of the object showing areas of high radiation traversal and/or areas of low radiation traversal.

Periodically radiography imaging systems are calibrated to correct for gain, offset, defect correction, etc. caused by detector arrays or electronic equipment (e.g., amplifiers, readout devices, etc.) of the imaging systems. Generally, calibrations are performed at the factory before the detector array is attached to other portions of the imaging system. Calibrations are also typically performed during an air scan or flat field scan (e.g., a scan in which no object is present and/or an object with known characteristics is present). During a calibration, the detector array emits pulses indicative of radiation (e.g., x-rays) that is detected. Because no object is present or an object with predetermined/known characteristics is present, the pulses generated by the respective pixels are expected to exhibit predetermined characteristics and may be compared to such predetermined characteristics. Discrepancies between actual characteristics of a pulse and predetermined characteristics of the pulse may be attributed to an error (e.g., an undesirable gain, defect, etc.), and a correction factor that is configured to correct for the error may be identified. The correction factor may be applied to pulses generated by the pixel during an examination of an object to improve the quality of resulting images, for example.

While the aforementioned calibration techniques have proven effective for reducing errors and improving the quality of resulting images, there are several limitations/disadvantages to the calibration techniques. For example, the factory calibrations are time consuming because a high number of radiation exposures (e.g., 60 exposures or more) are generally required to reduce the impact of photon noise, for example. As a result, such a calibration can last two hours or more. Moreover, because the calibration techniques require the emission of radiation, safety restrictions are typically imposed. For example, a technician is generally required to monitor the calibration. Thus, a technician's time is consumed, and the radiation system is unavailable during a time when the system would typically be in operation.

SUMMARY

Aspects of the present application address the above matters, and others. According to one aspect, a method for calibrating a direct conversion detector array is provided. The method comprises using a first power source to apply a first voltage to a photoconductor of the direct conversion detector array and using a second power source to apply a second voltage to the photoconductor, the second voltage different than the first voltage, wherein the difference between the first voltage and the second voltage causes a first electrical charge to be produced. The method further comprises detecting the first electrical charge and using the detected first electrical charge to calibrate the detector array.

According to another aspect, a method is provided. The method comprises detecting an electrical charge produced with a photoconductor of a direct conversion detector array, the electrical charge indicative of a change in voltage applied to the photoconductor.

According to another aspect, a method of calibrating a direct conversion detector array is provided. The method comprises applying a first voltage to a photoconductor of the direct conversion detector array and applying a second voltage to the photoconductor, the second voltage different than the first voltage, wherein the difference between the first voltage and the second voltage causes a first electrical charge to be produced. The method also comprises detecting the first electrical charge and at least one of: reapplying the first voltage to the photoconductor and reapplying the second voltage to the photoconductor, wherein the difference between the reapplied first voltage and the reapplied second voltage causes a second electrical charge to be produced, reapplying the first voltage to the photoconductor and applying a third voltage to the photoconductor, the third voltage different than the first voltage and the second voltage, wherein the difference between the first voltage and the third voltage causes a third electrical charge to be produced, and applying a third voltage to the photoconductor, the third voltage different than the first voltage and the second voltage, wherein the difference between the second voltage and the third voltage causes a third electrical charge to be produced. The method further comprises detecting at least one of the second electrical charge and the third electrical charge and using the detected first electrical charge and at least one of the detected second electrical charge and the detected third electrical charge to calibrate the detector array.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

Figure 1:
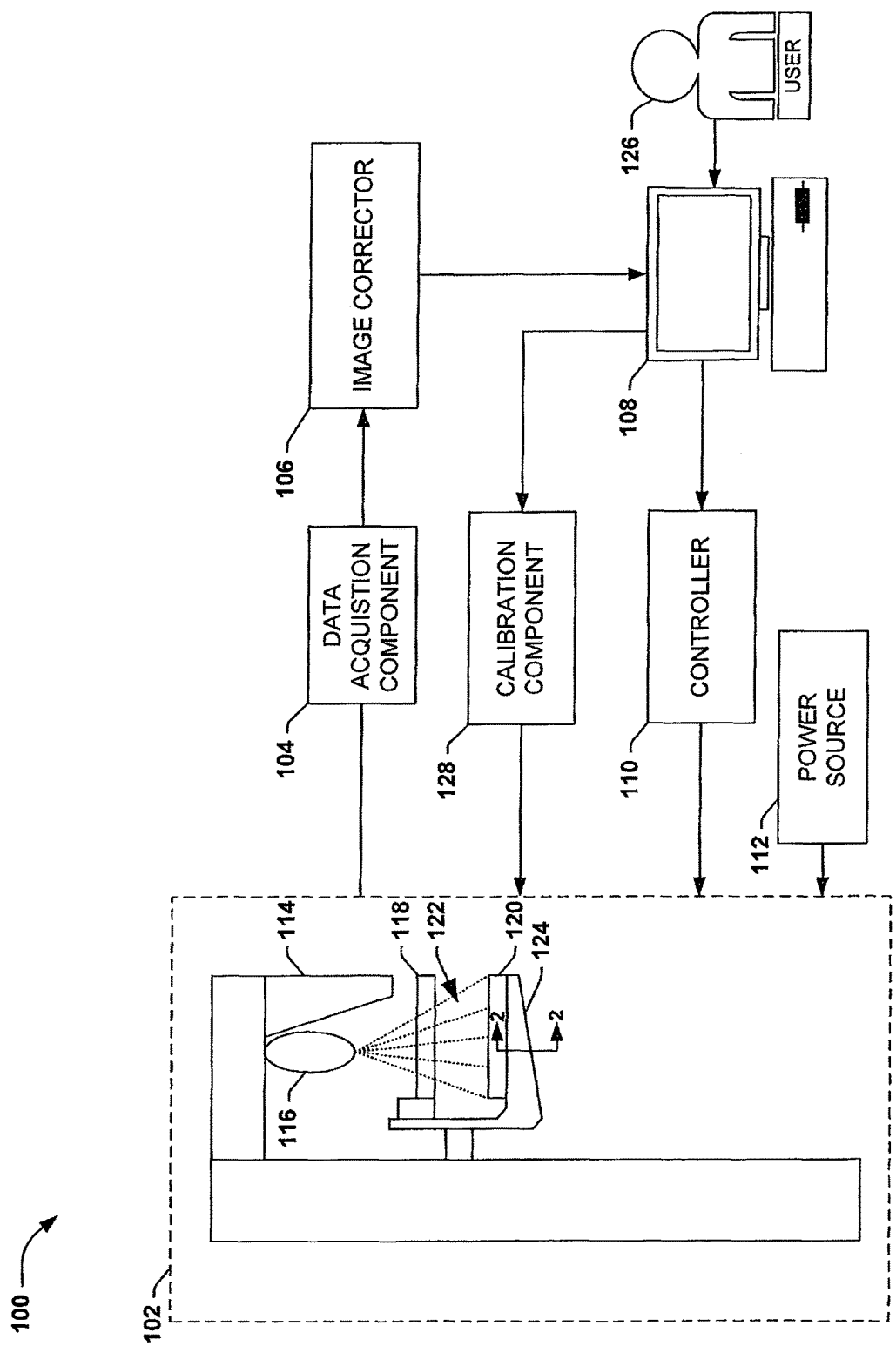
FIG. 1 is a schematic block diagram illustrating an example system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques are provided for calibrating a direct conversion detector array, or flat panel detector, of a radiographic imaging system. During a calibration of the direct conversion detector array, the voltage that is applied to a photoconductor, also referred to herein as a direct conversion material (e.g., amorphous selenium), of the direct conversion detector is changed. The change in voltage creates a displacement current in the photoconductor, which creates an electrical charge that is similar to the electrical charge that is created when radiation impinges the photoconductor. As provided herein, the electrical charge, or change in charge density created by the change in voltage, may be used to calibrate the direct conversion detector array. In this way, uniformity maps and/or gain tables can be created, for example. Such maps and/or tables can be used to generate a substantially defect-free, uniform image.

FIG. 1 depicts an example system 100. Such an example system 100 may be used for mammography at a medical center, for example. It will be understood to those skilled in the art that the specific configurations of the system may depend upon the intended functions of the system, and thus the systems and/or techniques described herein are not intended to be limited by the configurations of the example system 100. That is, other configurations of radiography systems that are known in the art are also contemplated. For example, in another embodiment, the system may be configured similar to a computed tomography (CT) scanner used at security checkpoints or medical centers (e.g., wherein the scanner is configured in the shape of a doughnut and the object being examined is placed in the center of the doughnut shape). In yet another embodiment, the system may be a line scanner similar to baggage scanners that are commonly used at security checkpoints, for example.

As illustrated, the system 100 typically comprises an object examination apparatus 102 configured to examine an object (e.g., human tissue, baggage, etc.). One or more images of the examined object may be presented on a monitor of a terminal 108 (e.g., a computer) for human observation, for example. In this way, aspects of the object that are not visible to the naked eye (e.g., tumors, bone fractures, etc.) may be displayed in the one or more images and, ultimately, may be detected by a user 126. In another example, such as where the system is a baggage scanner at an airport, a threat item inside of a suitcase can be identified based upon a scan, or examination, of the suitcase.

The object examination apparatus 102 is configured to examine an object under examination and transmit data related to the examination to other components of the system 100. Among other components, the object examination apparatus 102 comprises a radiation source 116 and a detector array 124. The radiation source 116 is configured to emit fan, cone, wedge, and/or other shaped radiation configuration into an examination region 122 of the object examination apparatus 102.

Aspects (e.g., masses, cancer, weapons, etc.) of the object can cause various amounts of radiation to traverse different portions of the object (e.g., creating areas of high traversal and areas of low traversal within the object). For example, less radiation may traverse aspects with a higher density (relative to densities of other aspects of the object). It will be appreciated that the changes in traversal may be used to create images of aspects of the object. For example, if human tissue is examined by the object examination apparatus 102, regions of tightly compacted (e.g., cancerous) cells may appear more prominently on an image than healthy cells (which may be virtually invisible).

Radiation that traverses the object under examination (e.g., an object situated in the examination region 122) is detected by the detector array 124 located on a diametrically opposing side of the object from the radiation source 116. As will be described in more detail with respect to FIG. 2, the detector array 124 is a direct conversion detector array. As will be understood to those skilled in the art, a direct conversion detector array is configured to convert radiation energy produced by detected radiation into electrical charge by a direct conversion material, or photoconductor, of the detector array 124. Stated differently, in a direct conversion detector array, radiation photons interact directly with the direct conversion material (e.g., creating electron-hole pairs) and an electrical charge is created which may pool at an interface of the direct conversion material (e.g., adjacent pixels of the detector array) to create a net charge density. The direct conversion material may comprise, for example, amorphous selenium, cadmium zinc telluride, silicon, or other direct conversion material known to those skilled in the art.

Radiation that traverses high traversal/less dense areas of the object may comprise more radiation energy and thus create a greater electrical charge than radiation that traverses low traversal/more dense areas. Therefore, the electrical charge that is generated when radiation strikes the detector array is indicative of properties or characteristics of the object. Pixels (e.g., a thin-film transistor (TFT) array) of the detector array 124 are configured to detect electrical charge, or a net charge density, that is generated in a region of the direct conversion material in close spatial proximity to the pixel and generate a digital or analog signal indicative of the detected charge. It will be appreciated that in some embodiments, pixels are configured to substantially continuously generate a signal and a pulse, or change in the signal, is generated when electrical charge is detected. In other embodiments, pixels may be configured to not emit a signal unless and/or until charge is detected.

It will be appreciated that an initial voltage is generally applied to the direct conversion material by a power source 112. In this way, an electrical field can be created that is configured to carry the generated electrical charge from the direct conversion material to the pixels. It will be understood to those skilled in the art that the initial voltage that is applied may depend upon the application of the example system 100 and/or the specifications of the direct conversion detector array 124 (e.g., thickness and/or type of direct conversion material, etc.), for example. In one example an initial voltage of 2000 Volts is applied to the direct conversion material by the power source 112 (but other voltages could be applied, of course, such as 10 or 20 Volts, for example). The act of applying an initial voltage is generally referred to as biasing the direct conversion material. Stated differently, a direct conversion material is biased when an initial voltage is applied to the direct conversion material. Generally, this initial voltage remains constant throughout an examination of an object. In this way, electrical charge produced by the direct conversion material during an examination is attributable to detected radiation.

In some embodiments, such as in applications where it is preferable to have the object fixed in a particular orientation for an extended period of time, object supports 118, 120 may be used to maintain the orientation of the object. For example, in a mammography system, the object supports 118, 120 may be used to compress breast tissue so as to flatten the breast tissue and improve the quality of resulting images. In other embodiments, the object may be placed on a bed or conveyor belt that is configured to allow the object to lay within and/or pass through the examination region 122, for example. A shield 114 can be configured to protect aspects of the object not being examined, such as a person's head, for example, from being exposed to radiation emitted by the radiation source 116.

The example system 100 further comprises a data acquisition component 104 that is operably coupled to the object examination apparatus 102. The data acquisition component 104 is configured to collect signal, information, and/or data related to radiation that was detected by the detector array 124. It will be appreciated that where the signals that are emitted by the respective pixels of the detector array 124 are in an analog domain, the data acquisition component 104 may also be configured to convert the signals into the digital domain using analog to digital techniques known to those skilled in the art. In one embodiment, the data acquisition component 104 can also be configured to compile the signals and/or data generated by respective signals into one or more projections of the object using techniques known to those skilled in the art.

The example system 100 also comprises an image corrector 106 that is operably coupled to the data acquisition component 104. The image corrector 106 is configured to correct for artifacts, errors, and/or other image degradation qualities in images yielded from the signals. For example, the image corrector 106 may be configured to correct for errors in signals that are caused by the pixels, misalignment of the radiation source and detector array, defects in the cover of the detector array 124 (e.g., a carbon fiber protective layer commonly referred to in the art as a Buckycover), etc.

As will be understood by those skilled in the art, the image corrector 106 generally comprises a database of correction factors for respective pixels that are configured to mitigate errors caused by gains, defects, etc. in the pixels, direct conversion material, electronic components of the radiography system 100, etc. Such a database may be referred to by those skilled in the art as an air table(s) or correction table(s), for example, because the errors are generally determined by performing an air scan or flat field scan (e.g., a scan performed without an object present in the examination region 122). It will be understood to those skilled in the art that the terms "air table" and "correction table" are used broadly herein refer to a database of information indicative of defects, non-uniformities, and/or other irregularities in the detector array and/or other electronic components of the radiography system 100, and not merely those determined by performing an air scan or flat field scan. Such a table may comprise data indicative of a uniformity map and/or a gain table, for example, that can be used to effect corrections.

As disclosed herein, at least some of the errors that may ordinarily be identified by an air scan or flat field scan may be identified using one or more of the techniques and/or systems described herein. Therefore, the terms "air table" may be misdescriptive of the database because a traditional air scan may not be performed to identify at least some of the errors associated with the air table. Thus, while the terms "air table(s)" may be used herein to describe a database containing numerical values for the errors and/or correction factors to correct for the errors, it will be appreciated that such terms are not intended to be limited to mean errors and/or correction factors derived from an air scan or flat field scan. It will also be appreciated that in other embodiments, the data acquisition component 104 may be configured to perform such corrections on the signals or resulting images instead of, or in conjunction with, the image corrector 106.

The example system 100 also comprises a terminal 108 (e.g., a computer) configured to receive the image space data from the image corrector 106. The terminal 108, which may comprise a monitor, can also be configured to display images of the object to a user 126 (e.g., security personnel, medical personnel, etc.). In this way, the user 126 can inspect the image(s) to identify areas of interest within the object(s). In some embodiments, the terminal 108 can also be configured to receive user input which can direct the object examination apparatus 102 how to operate and/or can be used for calibration of the object examination apparatus 102. For example, as will be described below in more detail, in one embodiment, the terminal 108 may automatically and/or with user input direct a calibration component 128 when to perform a calibration of the detector array 124.

The example system 100 also comprises a controller 110 that is operably coupled to the terminal 108. In one example, the controller 110 is configured to receive user input from the terminal 108 and generate instructions for the object examination apparatus 102 indicative of operations to be performed. For example, the user 126 may want to reexamine the object, and the controller 110 may convert user input into a computer command that instructs the radiation source 116 to output additional radiation.

The example system 100 also comprises a calibration component 128 that is operably coupled to the terminal 108 and is configured to perform calibration techniques on the object examination apparatus, or more particularly, on the detector array 124. For example, as will be described below, the calibration component 128 can be configured to specify the voltage for a charge that is injected into the detector array 124 for calibration purposes. In other embodiments, the calibration component 128 may be configured to determine when to perform a calibration based upon a time lapse since a previous calibration, a number of examinations since a previous calibration, etc.

It will be appreciated that the example system 100 and components of the example system described herein are intended to merely illustrate an example system and are not intended to be construed as limiting the scope of the system and/or claimed subject matter. For example, the system 100 may comprise an image reconstructor that is configured to convert projection space data into image space data using tomosynthesis, for example. In another embodiment, the example calibration component 128 may be part of the detector array 124. In another embodiment, the power source 112 may be part of the object examination apparatus 102. Thus, the components of a radiography imaging system may vary and/or the orientation of the described components may differ from the example system 100 without limiting the scope of claimed subject matter.

Figure 2:
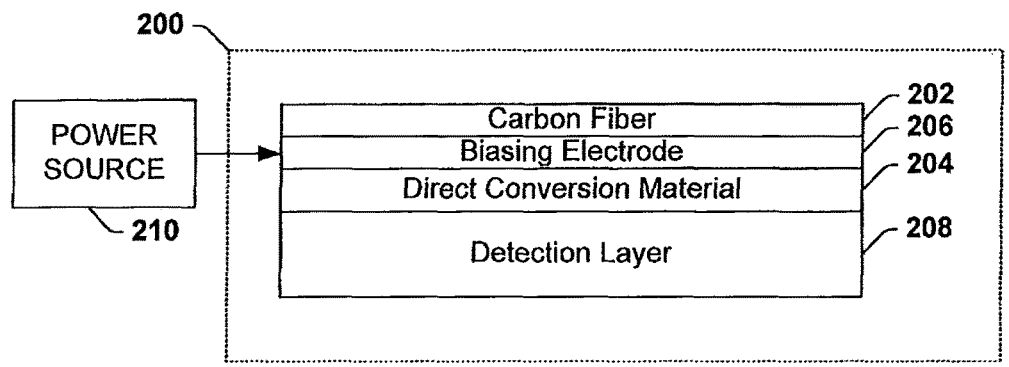
FIG. 2 illustrates a component block diagram of a detector array.

FIG. 2 illustrates a cross-section of an example direct conversion detector array 200 (e.g., 124 in FIG. 1 along line 2-2). As illustrated, the detector array 200 comprises a carbon fiber layer 202 that is configured to protect the detector array from damage and allow radiation emitted from a radiation source (positioned above the detector array 200) (e.g., 116 in FIG. 1) to pass through. It will be appreciated that this layer 202 maybe referred to by those skilled in the art as the Bucky cover. It will also be appreciated that while the layer 202 is described herein as a carbon fiber layer, other materials that have suitable characteristics (e.g., can protect other layers from damage, permit radiation to pass through substantially unimpeded, etc.) are also contemplated herein. Moreover, the Bucky cover 202 may be comprised of a combination of two or more materials, one of which may, or may not, be carbon fiber, for example.

The detector array 200 also comprises a direct conversion material layer, or photoconductor, 204 that is configured to generate electrical charge in response to radiation energy detected by the direct conversion material. Stated differently, as radiation photons impinge the direct conversion material 204, electron-hole pairs are created, creating an electrical charge. Because the direct conversion material 204 is biased (as mentioned above and described below), charges begin to drift, creating a current inside of the direct conversion material 204 and a net charge density will be generated near an interface of the direct conversion material 204 between the direct conversion material 204 and a detection layer 208 and/or between the direct conversion material 204 and a biasing electrode 206. The amount of electrical charge produced is a function of the radiation energy that is detected. Generally, higher levels of electrical charge (e.g., which create a higher net charge density) are produced from higher radiation intensity (e.g., a greater dose). Thus, the electrical charge that is produced is indicative of the amount of radiation that has traversed the object.

It will be appreciated that numerous direct conversion materials are known to those skilled in the art and are contemplated for use herein. For example, the direct conversion material may comprise amorphous selenium, cadmium zinc telluride (CdZnTe), silicon, and/or other material that has characteristics which allow it to convert radiation energy into electrical charge.

As will be understood to those skilled in the art, to create the current in the direct conversion material 204 and/or to cause the electrical charge to pool at an interface of the direct conversion material 204, the example direct conversion detector array 200 comprises a biasing electrode 206 that is configured to apply an initial voltage, or bias, to the direct conversion material 204. In this way, the current drifts and a net charge density develops at an interface of the direct conversion material 204 proximate to the pixels of the detection layer 208. For example, in one embodiment, the direct conversion material 204 is biased by applying 2000 volts, generated by a power source 210 (e.g., 112 in FIG. 1), to the biasing electrode 206.

As described below with respect to FIGS. 4-5, the biasing electrode 206 may also be used for calibration purposes. For example, in one embodiment, after a biasing voltage is applied to the direct conversion material 204 by the biasing electrode 206, a second voltage may be applied to the direct conversion material 204 by the biasing electrode 206, causing a change in a resulting electrical field. Such a change in the electrical field may cause an electrical charge to be produced at an interface of the direct conversion material 204 proximate to the detection layer 208. Thus, the charge density at an interface of the direct conversion material may be (controllably) altered (e.g., similar to a change in charge density that is caused by impinging radiation).

Electrical charge, or a net charge density that has developed at an interface of the direct conversion material 204 proximate to a detection layer 208 (e.g., a TFT array, complementary metal-oxide-semiconductor (CMOS) array, and/or other pixilated array), is detected by one or more pixels of the detection layer 208 of the detector array 200. Generally, those pixels that are in close spatial proximity to the position whereon the radiation impinged the detector array 200 detect the electrical charge and other pixels do not. Thus, the trajectory of the radiation can be determined by drawing an imaginary line from the focal spot of a radiation source (where radiation was emitted) to the pixels that detected the electrical charge. As will be understood to those skilled in the art, identifying the trajectory may be significant for some reconstruction techniques, such as tomography, which attempts to reconstruct a 3D image of the object from a plurality of two dimension projections.

Figure 3:
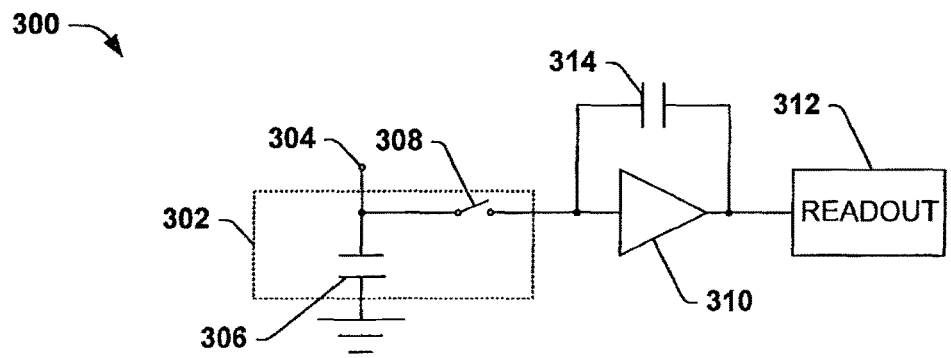
FIG. 3 illustrates a schematic of an example pixel and data acquisition component.

FIG. 3 illustrates an example schematic 300 of a thin film transistor 302 and other components, which may be part of the pixel and/or part of a data acquisition component (e.g., 104 in FIG. 1), for example. The electrical charge that is generated by a direct conversion material layer from impinging radiation (e.g., 204 in FIG. 2) and/or generated at an interface of the direct conversion material by a change in the voltage applied to the direct conversion material (e.g., by a biasing electrode 206 in FIG. 2) is received at an input 304. As will be understood to those skilled in the art, the thin film transistor 302 comprises a storage capacitor 306 and a switch 308. The storage capacitor 306 is configured to store a charge while the switch 308 is open. When the switch 308 is closed, the charge stored in the storage capacitor 306 flows through the switch and into an integrator 310, or charge amplifier, which is operably coupled to the switch. The integrator 310 is configured to convert the charge into a voltage and output the voltage to a readout device 312 that is operably coupled to the integrator 310. The readout device 312 is configured to perform a sample and hold and convert the analog signal into the digital domain. A capacitor 314 that is operably coupled to the integrator 310 is configured to, among other things, reduce or mitigate a backward current flow.

It will be appreciated that the schematic 300 illustrated in FIG. 3 is merely an example schematic and other schematics known to those skilled in the art are also contemplated. For example, in another example, the integrator 310 may be part of the pixel 302. In another example, the circuitry of the pixel 302 and/or data acquisition component may differ from the example circuitry.

Figure 4:
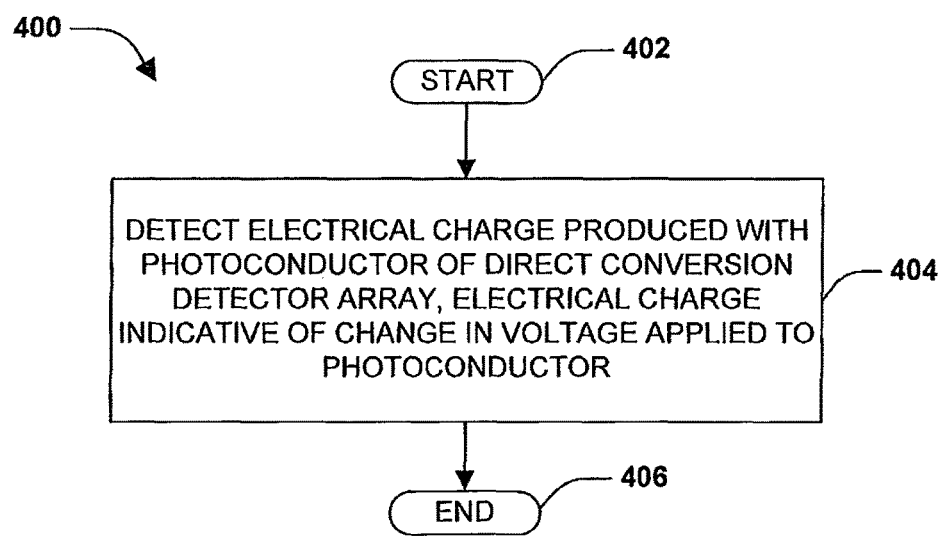
FIG. 4 is a flow diagram illustration an example method.

FIG. 4 illustrates an example method 400. The example method 400 begins at 402 and an electrical charge produced with a photoconductor (e.g., amorphous selenium), or direct conversion material, of a direct conversion detector array is detected at 404. The electrical charge is indicative of a change in voltage applied to the photoconductor (e.g., by a biasing electrode 206 in FIG. 2). For example, in one embodiment, a first voltage, which can be ground or zero voltage, for example, is applied to bias the photoconductor during a first time interval, and a second voltage, different than the first voltage, is applied to the photoconductor during a second time interval subsequent to the first time interval.

It will be appreciated that the amount of change may vary according to the initial voltage that is applied, the type and/or thickness of the photoconductive material, gain settings of the detector array, etc. For example, in one embodiment, the change in voltage may be equivalent to a low exposure dose of radiation (e.g., a change of about 10 V or more). In another embodiment, the change in voltage may be equivalent to a high exposure dose of radiation (e.g., a change of about 100 V or more). It will also be appreciated that the term "change" as used herein may be an increase or decrease in the applied voltage. For example, in one embodiment, the initial voltage that is applied is 2000 V and the second voltage that is applied is 2010 V, resulting in a voltage change of plus 10 V. In another embodiment, the second voltage that is applied is 1990 V, resulting in a voltage change of minus 10 V.

In one embodiment, the electrical charge, or change in the charge density, that is detected is used to calibrate the detector array. For example, the detected electrical change may be used to generate a uniformity map, gain table, and/or other calibration table (e.g., air table/correction table) that is known to those skilled in the art. In this way, the detected electrical change may be used to calibrate for at least one of non-uniformity in the photoconductor, defects in the photoconductor, gains in an amplifier (e.g., 310 in FIG. 3), gains in a pixel, and/or defects in a detection layer (e.g., 208 in FIG. 2), for example. In this way, correction factors that may be applied to signals and/or data output from the detector array or data acquisition components during an examination can be calculated without performing an air scan or flat field scan (which requires the emission of radiation) and may be performed on site or outside of a manufacturing facility, for example. Stated differently, defects and/or errors in the direct conversion material layer (e.g., 204 in FIG. 2) of a detector array (e.g., 200 in FIG. 2) and/or components of the system that proceed the direct conversion material may be identified without emitting radiation. It will be appreciated that for some calibration procedures, such as to detect misalignment of the focal spot, defects in radiation filters, and/or defects in the Bucky cover (e.g., 202 in FIG. 2) of the detector array, for example, radiation may still be required to be emitted.

The example method 400 ends at 406.

Figure 5:
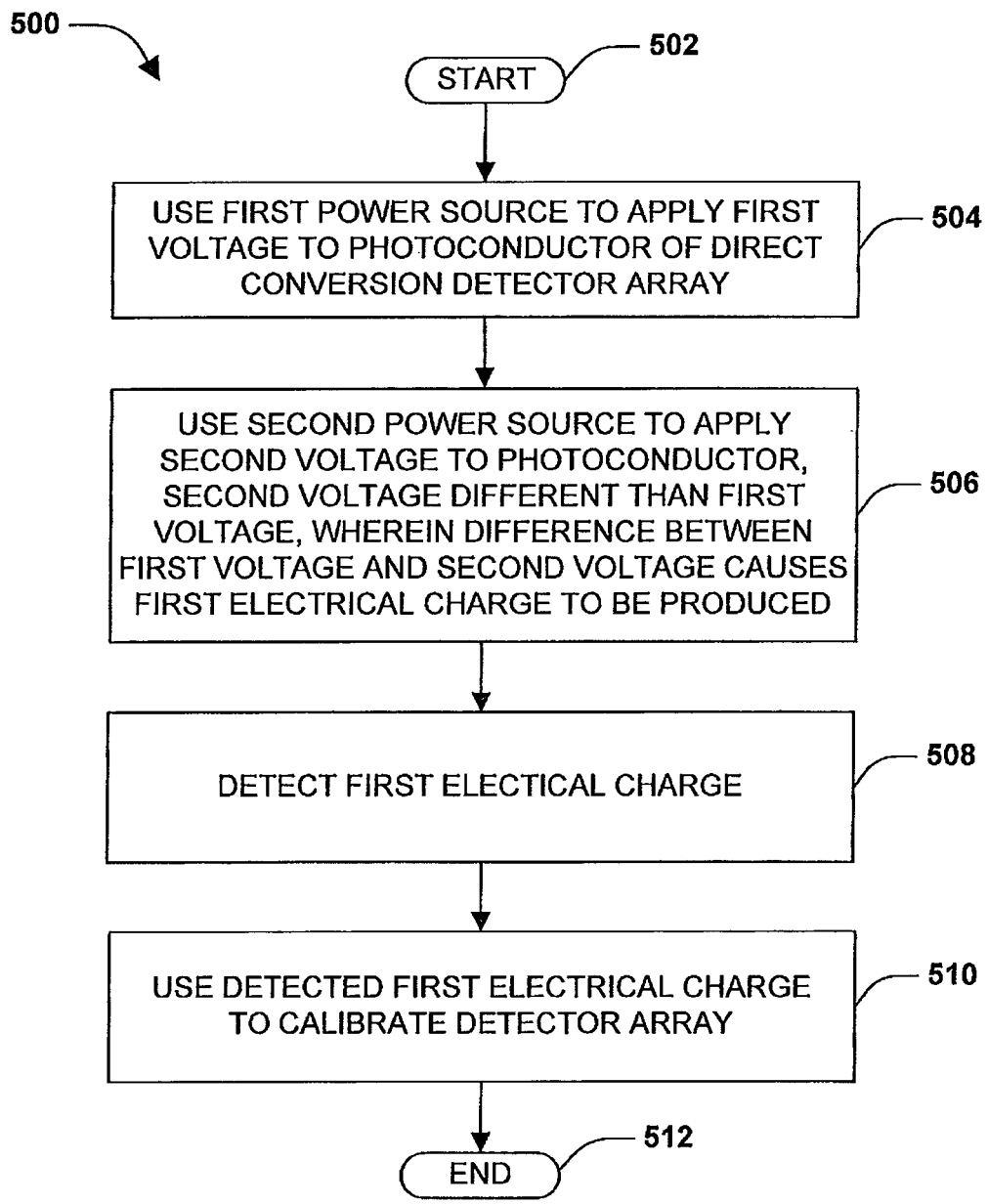
FIG. 5 is a flow diagram illustrating an example method of calibrating a direct conversion detector array.

FIG. 5 illustrates an example method 500 for calibrating a direct conversion detector array, such as the detector array 200 illustrated in FIG. 2. The method begins at 502 and a first power source (e.g., 210 in FIG. 2) is used to apply a first voltage to a photoconductor of the direct conversion detector array at 504. As previously described, this first voltage may be configured to bias the photoconductor such that if and/or when it detects radiation, an electrical charge can be produced from the change in voltage that is produced by impinging radiation.

At 506 a second power source is used to apply a second voltage to the photoconductor. The second voltage is different than the first voltage and causes a first electrical charge to be produced at an interface of a photoconductor adjacent a pixel (e.g., a TFT array). Stated differently, the change in voltage between the first voltage and the second voltage causes a first electrical charge to be produced and/or causes a change in the net charge density at an interface of the photoconductor. It will be appreciated that the change in voltage that is applied may be a function of the type and/or thickness of the photoconductor, the type of calibration that is being performed, and/or the gain settings of the detector, for example. It will also be appreciated that a net charge density (e.g., indicative of the amount of electrical charge that is produced) is a function of the change in voltage. For example, a change in voltage of 100V may cause a greater net charge density to be produced than a voltage change of 10V, for example.

It will be appreciated that while the terms first power source and second power source are used herein, the terms "first" and "second" are not intended to be construed to necessarily be two different power sources. That is, in one embodiment, the first power source and the second power source may be the same power source. In another embodiment, the first power source and the second power source may be different power sources. Thus, the terms "first power source" and "second power source" are intended to be used broadly herein to be one power source or two or more, different power sources.

At 508, the first electrical charge, or other net charge density, is detected. Generally, the electrical charge is detected by pixels of a detection layer (e.g., 208) portion of the detector array. For example, in one embodiment, the pixels of a thin film transistor array (e.g., 302 in FIG. 3) are configured to collect electrical charge produced at an interface of the photoconductor that is in close spatial proximity to the respective pixels. It will be appreciated that in other embodiments the detector array may comprise other types of pixilated arrays. For example, in another embodiment, the detector array may comprise a complementary metal-oxide-semiconductor (CMOS) array. Generally, the pixels of the pixilated array are periodically configured to release the electrical charge and a signal, or a pulse in a continuously emitted signal, is generated indicative of the electrical charge that is produced.

At 510, the detected first electrical charge is used to calibrate the detector array. That is, the first electrical charge is used to identify errors in the detector array, amplifiers, readout devices, etc. and/or to identify correction factors that may correct for such errors. For example, in one embodiment, the detected first electrical charge may be used to create a uniformity map, gain table, and/or other air table, which can be used to correct signals/pulses generated from respective pixels during an examination of an object. Stated differently, the detected electrical charge may be used to calibrate for at least one of non-uniformity in the photoconductor, defects in the photoconductor, gains in the pixels, gains in other electronic components of the system, such as the amplifier (e.g., 310 in FIG. 3), etc. In this way, air tables or correction tables (which conventionally are generated using air scans or flat field scans) may be generated without emitting radiation, for example.

In one embodiment, the acts may be repeated a plurality of times to refine the calibration and/or ensure the accuracy of the calibration. For example, the second power source may be used to reapply the second voltage to the photoconductor (e.g., once the photoconductor has returned to the state of the first voltage) and electrical charge produced from the difference between the first voltage and the second voltage can be detected and compared with the data produced from the first electrical charge. In this way, the accuracy of the correction factors that are applied to signals and/or data during an examination of an object may be improved so that additional errors (which may further degrade the image quality of a resulting image) are not introduced into the signals and/or data by inaccurate correction factors.

In another embodiment, a third power source (e.g., which may be different than the first and second power sources or may be one of the first or second power sources) is used to apply a third voltage to the photoconductor. The third voltage is different than the first and second voltages. Moreover, the difference between at least one of the first voltage and third voltage and the second voltage and the third voltage causes a second electrical charge to be produced. Stated differently, the third voltage may be applied while the second voltage is being applied (e.g., causing the second electrical charge to be the difference between the second and third voltages) or may be applied while the first, but not the second, voltage is applied (e.g., causing the second electrical charge to be the difference between the first and third voltages). Stated differently, when three or more voltages are applied, the voltages can be applied in a pulse mode, where between voltage changes the photoconductor returns to a baseline voltage (e.g., the first voltage), or in a staircase mode, where the photoconductor is not returned to a baseline voltage before applying another voltage is applied. That is, in a staircase mode, after a second voltage is applied (and a first electrical charge is produced), a third voltage is applied (and a second electrical charge is produced) before the photoconductor returns to a baseline voltage (e.g., a first voltage). It will be understood to those skilled in the art that whether a pulse mode or a staircase mode is chosen for applying the voltages may be a function of the photoconductor used in the detector array, for example. For example, where the detector array comprises a photoconductor with a high leakage current and/or where the system is in a low frame-rate mode, a pulse mode method may be more suitable than a staircase mode method. Conversely, where the detector array comprises a photoconductor with a low leakage current and/or where the system is in a high frame-rate mode, a staircase mode method may be more suitable than a pulse mode method.

Similar to the first electrical charge, the second electrical charge is detected by the detection layer (e.g., 208 in FIG. 2) and can be used to calibrate the detector array and/or other components that proceed the detector array. For example, in one embodiment, errors produced by components of the detector array and/or correction factors to correct for the errors may be identified using both the first electrical charge and the second electrical charge. In this way, the errors and/or correction factors may be identified using more data points (e.g., causing the accuracy of the identifications to improve relative to a single data point), for example.

The example method 500 ends at 512.

Figure 6:
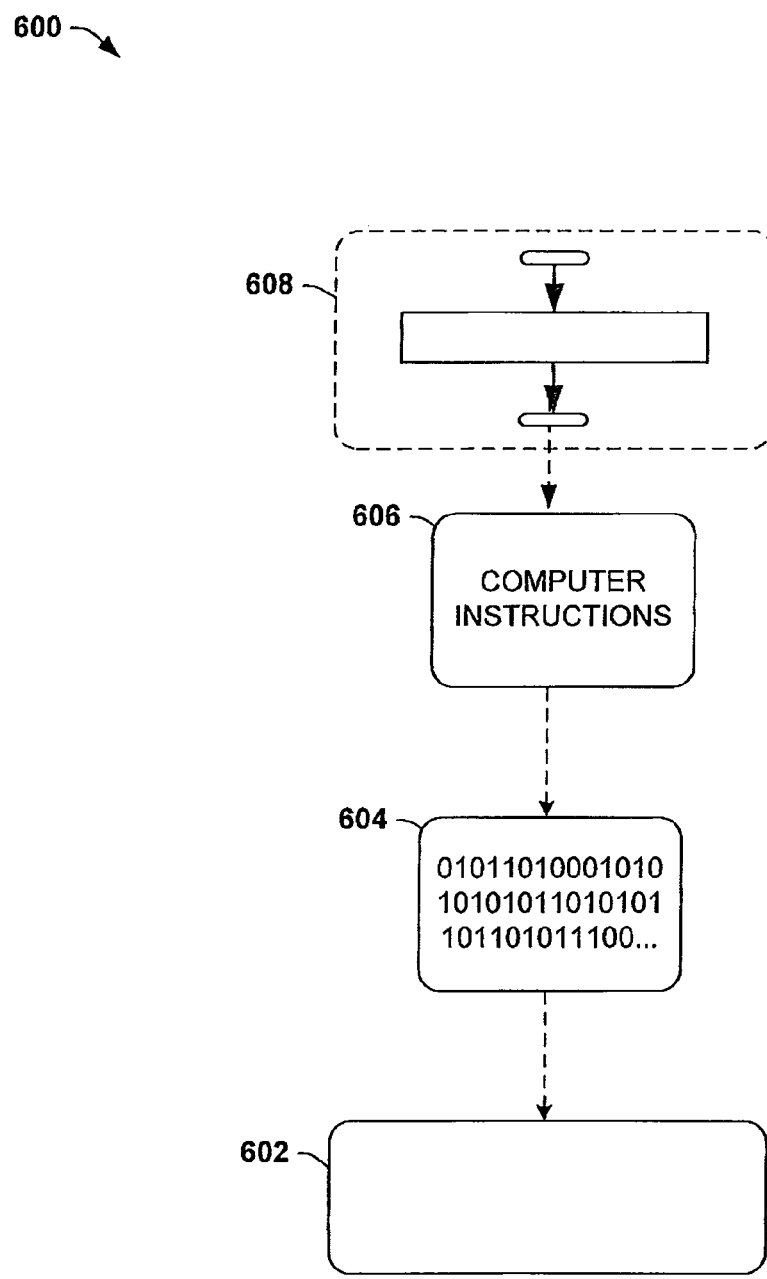
FIG. 6 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 6, wherein the implementation 600 comprises a computer-readable medium 602 (e.g., a flash drive, a CD-R, DVD-R, or a platter of a hard disk drive), on which is encoded computer-readable data 604. This computer-readable data 604 in turn comprises a set of computer instructions 606 configured to operate according to one or more of the principles set forth herein. In one such embodiment 600, the processor-executable instructions 606 may be configured to perform a method 608, such as the example methods 400 of FIG. 4 and/or 500 of FIG. 5, for example. In another such embodiment, the processor-executable instructions 606 may be configured to implement a system, such as at least some of the exemplary system 100 of FIG. 1, for example. Many such computer-readable media may be devised by those of ordinary skill in the art that are configured to operate in accordance with one or more of the techniques presented herein.

It will be appreciated to those skilled in the art that there are numerous benefits to the systems and/or techniques disclosed herein. For example, because the calibration can be performed without the emission of radiation, the methods disclosed herein can be performed programmatically, or automatically. Stated differently, a computer program, for example, can automatically schedule a calibration to be performed after a predetermined time has lapsed and/or a predetermined number of examinations have been performed, for example. Thus, a technician, which is usually required to monitor the calibration of a system during radiation exposures, may not be required to monitor the calibration. Moreover, because the calibration can be performed programmatically, it can be performed at off-times when the system would typically not be in use, such as in the middle of the night, for example.

The systems and/or techniques described herein also promote a faster calibration procedure. For example, whereas a traditional calibration procedure (using radiation) requires a high number of radiation exposures (e.g., 60 exposures or more) to reduce the impact of photon noise and may therefore take up to two or more hours to perform, a calibration procedure using the techniques herein may take significantly less time at least partially because the number of exposures (e.g., changes in voltage and/or radiation exposure) may be reduced and the length of time between exposures may be reduced. For example, the calibration procedure may be complete in five minutes, but generally does not take more than thirty minutes. Moreover, in one embodiment, less than thirty images are generated (compared with the at least sixty that are typically generated during a calibration).

Further, because the voltage is applied at the photoconductor, defects attributable to the photoconductor, the pixilated array, and/or other electronic devices proceeding the photoconductor may be decoupled from defects attributable to the Bucky cover, radiation filters, etc. Stated differently, in convention calibration procedures (e.g., where radiation is emitted) it is difficult to determine whether the errors are caused by the radiation filters, Bucky cover, photoconductor, pixilated array, etc. because there is no measurement of the error before the readout device (e.g., 312 in FIG. 3). Using the techniques disclosed herein, it can be determined whether the errors/defects occur in portions of the system preceding the photoconductor or in portions of the system proceeding, and including, the photoconductor because errors/defects occurring in portions of the system proceeding, and including, the photoconductor will appear in data yielded from the techniques and/or systems disclosed herein. Thus, errors/defects that appear in data yielded from air scans or flat field scans, but not in data yielded from the calibration techniques disclosed herein may be attributable to portions of the system preceding the photoconductor.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for calibrating a direct conversion detector array comprising:
   applying a first voltage to a biasing electrode of the direct conversion detector array disposed in a radiation pathway between an x-ray radiation source and a radiation conversion material;
   applying a second voltage to the biasing electrode, the second voltage different than the first voltage, wherein a difference between the first voltage and the second voltage causes a first electrical charge to be produced within the radiation conversion material;
   measuring the first electrical charge to generate a first measurement;
   performing an air scan during which x-ray radiation is emitted, wherein second electrical charge is produced within the radiation conversion material due to an interaction of the x-ray radiation with the radiation conversion material;
   measuring the second electrical charge to generate a second measurement; and
   comparing the first measurement to the second measurement to identify defects attributable to an element in the radiation pathway upstream of the radiation conversion material.

2. The method of claim 1, comprising using the first measurement to correct for a non-uniformity in the radiation conversion material.

3. The method of claim 1, comprising at least one of:
   programmatically applying the first voltage to the biasing electrode; or
   programmatically applying the second voltage to the biasing electrode.

4. The method of claim 1, comprising:
   reapplying the second voltage to the biasing electrode, wherein a difference between the first voltage and the reapplied second voltage causes a third electrical charge to be produced;
   measuring the third electrical charge to generate a third measurement; and
   calibrating the direct conversion detector array using the first measurement, the second measurement, and the third measurement.

5. The method of claim 1, comprising:
   applying a third voltage to the biasing electrode, the third voltage different than the first voltage and the second voltage, wherein a difference between the third voltage and at least one of the first voltage or the second voltage causes a third electrical charge to be produced;
   measuring the third electrical charge to generate a third measurement; and
   calibrating the direct conversion detector array using the first measurement, the second measurement, and the third measurement.

6. The method of claim 5, comprising:
   prior to applying the third voltage, reapplying the first voltage, and the third electrical charge indicative of a difference between the first voltage and the third voltage.

7. The method of claim 5, the applying a third voltage comprising applying the third voltage immediately subsequent to the applying a second voltage, and the third electrical charge indicative of a difference between the second voltage and the third voltage.

8. The method of claim 1, comprising generating a defect map of the radiation conversion material using the first measurement.

9. A method, comprising:
   generating first electrical charge in a radiation conversion material by varying a voltage applied to the radiation conversion material by a biasing electrode disposed in a radiation pathway between an x-ray radiation source and the radiation conversion material;
   storing the first electrical charge in a capacitor;
   converting the first electrical charge stored in the capacitor into a voltage signal;
   generating a first measurement indicative of the first electrical charge stored in the capacitor using the voltage signal;
   performing an air scan during which x-ray radiation is emitted, wherein second electrical charge is produced within the radiation conversion material due to an interaction of the x-ray radiation with the radiation conversion material;
   measuring the second electrical charge to generate a second measurement; and
   comparing the first measurement to the second measurement to identify defects attributable to an element in the radiation pathway upstream of the radiation conversion material.

10. The method of claim 9, comprising using the first measurement to correct for a non-uniformity in the radiation conversion material.

11. The method of claim 9, comprising generating a defect map of the radiation conversion material using the first measurement.

12. The method of claim 9, the radiation conversion material comprising cadmium zinc telluride.

13. The method of claim 9, the converting comprising selectively coupling the capacitor to an integrator.

14. The method of claim 9, the voltage varied by at least 10 V.

15. The method of claim 9, the radiation conversion material comprising amorphous selenium.

16. The method of claim 9, comprising correcting for at least one of gain in a pixel of a direct conversion detector array comprising the radiation conversion material, a defect in the pixel, or gain in an amplifier using the first measurement.

17. The method of claim 9, the first electrical charge not produced by detected x-ray radiation.

18. A method of calibrating a direct conversion detector array comprising:
- applying a first voltage to a biasing electrode of the direct conversion detector array disposed in a radiation pathway between an x-ray radiation source and a radiation conversion material;
- applying a second voltage to the biasing electrode, the second voltage different than the first voltage, wherein a difference between the first voltage and the second voltage causes a first electrical charge to be produced within the radiation conversion material of the direct conversion detector array;
- measuring the first electrical charge to generate a first measurement;
- performing an air scan during which x-ray radiation is emitted, wherein second electrical charge is produced within the radiation conversion material due to an interaction of the x-ray radiation with the radiation conversion material;
- measuring the second electrical charge to generate a second measurement;
- calibrating the direct conversion detector array using the first measurement to correct for one or more defects in the radiation conversion material; and
- comparing the first measurement to the second measurement to identify one or more defects attributable to an element of the direct conversion detector array in the radiation pathway upstream of the radiation conversion material.

19. The method of claim 18, the calibrating further comprising correcting for gain in a pixel of the direct conversion detector array, a defect in the pixel, a defect in the radiation conversion material, or gain in an amplifier.

20. The method of claim 18, comprising:
- applying a third voltage to the biasing electrode, the third voltage different than the first voltage and the second voltage, wherein a difference between the third voltage and at least one of the first voltage or the second voltage causes a third electrical charge to be produced;
- measuring the third electrical charge to generate a third measurement; and
- further calibrating the direct conversion detector array using the third measurement.

* * * * *